United States Patent
Hansen

(10) Patent No.: US 9,993,069 B2
(45) Date of Patent: Jun. 12, 2018

(54) STEERING MECHANISM FOR HEIGHT-ADJUSTABLE FURNITURE, IN PARTICULAR TABLES, AND METHOD THERETO

(71) Applicant: Kesseböhmer Produktions GmbH & Co. KG, Weilheim/Teck (DE)

(72) Inventor: Melf Hansen, Gondelsheim (DE)

(73) Assignee: KESSEBÖHMER PRODUKTIONS GMBH & CO. KG, Weilheim/Teck (DE)

( * ) Notice: Subject to any disclaimer, the term of this patent is extended or adjusted under 35 U.S.C. 154(b) by 0 days. days.

(21) Appl. No.: 15/070,348

(22) Filed: Mar. 15, 2016

(65) Prior Publication Data

US 2017/0265641 A1   Sep. 21, 2017

(51) Int. Cl.
| | |
|---|---|
| A47B 9/00 | (2006.01) |
| G05B 15/02 | (2006.01) |
| G01L 5/16 | (2006.01) |
| G01L 1/20 | (2006.01) |
| G01L 1/16 | (2006.01) |

(52) U.S. Cl.
CPC .......... *A47B 9/00* (2013.01); *G01L 5/16* (2013.01); *G05B 15/02* (2013.01); *G01L 1/16* (2013.01); *G01L 1/20* (2013.01)

(58) Field of Classification Search
CPC ........... H02H 7/0851; E05Y 2900/106; E05F 15/1607; E05F 15/0004; B60J 7/0573
USPC ........................................................ 318/466
See application file for complete search history.

(56) References Cited

U.S. PATENT DOCUMENTS

| | | | | |
|---|---|---|---|---|
| 2013/0093365 A1* | 4/2013 | Huck | ...................... | H02P 31/00 |
| | | | | 318/3 |
| 2013/0293173 A1* | 11/2013 | Strothmann | .............. | H02P 3/06 |
| | | | | 318/466 |
| 2014/0109802 A1* | 4/2014 | Dienes | ..................... | A47B 9/00 |
| | | | | 108/50.11 |

FOREIGN PATENT DOCUMENTS

| | | |
|---|---|---|
| DE | 20 2014 005 160 U1 | 7/2014 |
| DE | 10 2013 107 053 A1 | 10/2014 |
| EP | 1 460 914 B1 | 2/2008 |
| EP | 2 583 586 B1 | 5/2014 |

OTHER PUBLICATIONS

Office Action dated Jul. 21, 2015 in German patent application DE 10 2014 221 265.0, partial machine translation provided.

* cited by examiner

*Primary Examiner* — Kawing Chan
*Assistant Examiner* — Bradley Brown
(74) *Attorney, Agent, or Firm* — Hassan Abbas Shakir; Katten Muchin Rosenman LLP

(57) ABSTRACT

A circuit controls a height-adjustable table. A current load acts on the table plate and is measured by a force-sensitive sensor and serves as control signal of a control according to the invention. Derived from this signal, a collision of the electrically height-adjustable table with fixed objects is recognized. Control signals are also detected, which are inputted by an operator of the table in the form of applications of force onto the table plate. Here, the table or respectively the control device is situated in a state of rest until the user of the table exerts a brief force impulse onto the table plate, i.e. presses once onto the table plate. Thereafter, the control changes from a state of rest into an operating state and waits for control inputs. When the user now presses from above onto the table plate, the latter moves electrically downwards.

24 Claims, 2 Drawing Sheets

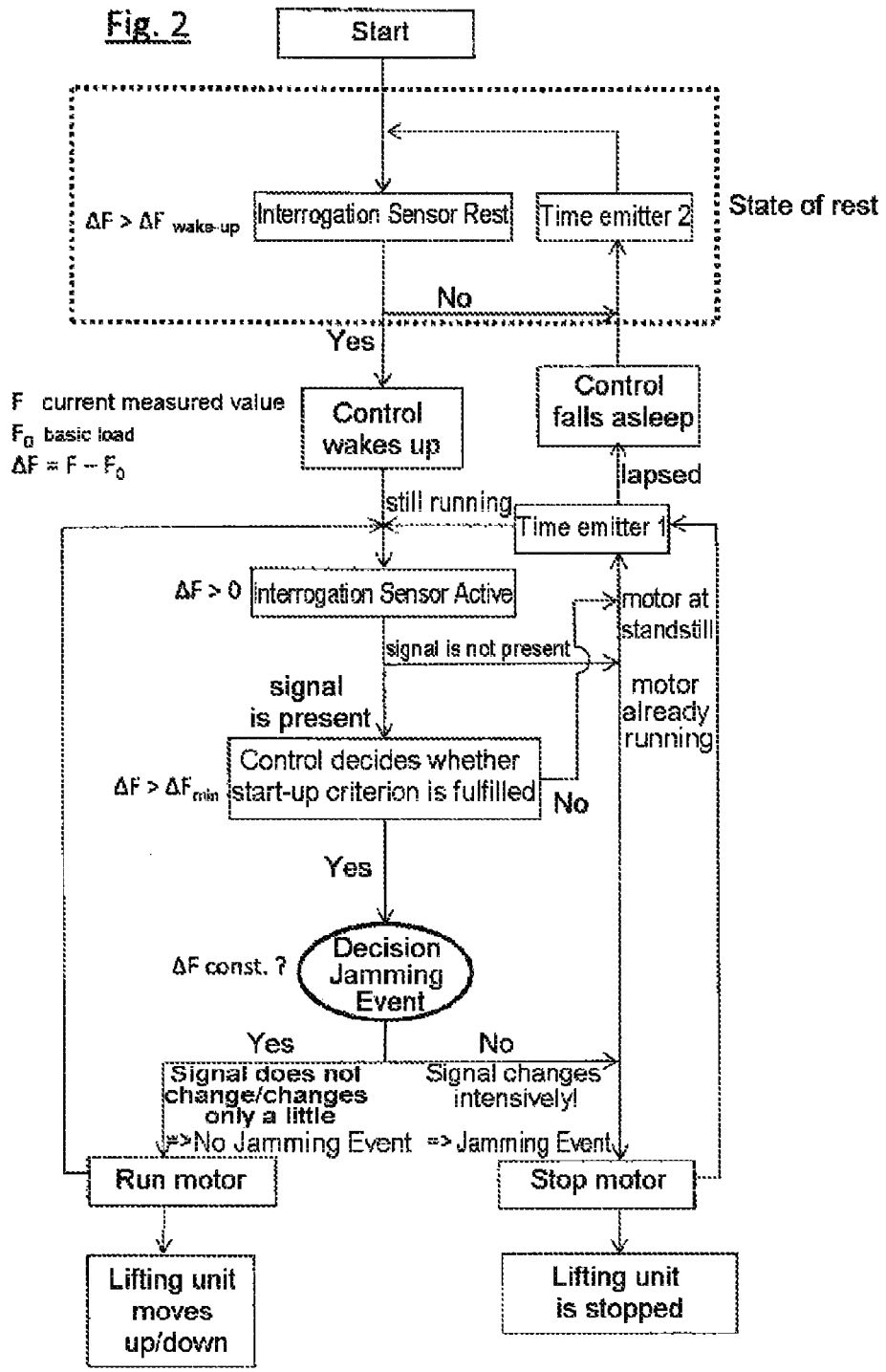

STEERING MECHANISM FOR HEIGHT-ADJUSTABLE FURNITURE, IN PARTICULAR TABLES, AND METHOD THERETO

BACKGROUND

1. Field of the Invention

The invention relates to a mechanism for the height adjustment of a height-adjustable furniture part of a height-adjustable item of furniture, and a method for this.

2. Discussion of the Related Art

From the prior art, items of furniture are known with automatically movable parts, such as for example desks or work tables with a height-adjustable table plate. It is known to realize such a height adjustment device by means of electric motors integrated into the table column. It is known, furthermore, for the operation of the integrated motors, to provide input elements which are arranged for example under the table plate. Such operating elements or input elements have different switches, for example respectively a switch for raising and lowering the table plate. Conventionally, in addition cables must be provided between operating element and table column, in order to connect the operating element with the table column or respectively with the electric motor which is integrated into the table column.

For operation of such a table, an operator, who carries out for example activities by hand/manually on the table plate, must direct one hand to the operating element, in order to actuate the corresponding switch for the desired control command. Furthermore, the operator must avert his eyes from his current activity and throw a glance at the operating element, in order to be able to locate the correct switch. This is because the switches for an upward or respectively downward movement usually lie adjacent to one another, so that an intuitive operation is not guaranteed.

For example, from DE 10 2013 107 053 A1 or DE 20 2014 005 160 U1 in addition height-adjustable tables are known, in which the table plate itself can be used as activation of a height adjustment of the table plate via a force sensor. In order to activate the force sensor, so that an application of pressure or traction on the table plate by the operator can be recognized as the triggering of the height adjustment of the table plate, an actuation unit is provided on the table plate, such as for example a proximity switch, an induction loop or a membrane switch, which delivers a signal to the control unit, by means of which it detects that the table is to be moved upward or downward. However, this system has the disadvantage that the table plate manufacturer has to incorporate or respectively add the actuation unit extra for this. Furthermore, these elements are expensive and are also usually at risk of being damaged owing to the installation site.

Furthermore, devices are known for the electrical height adjustment of tables, which can detect collisions of the moving table plate with rigid objects and subsequently terminate a movement of the plate. Such devices for collision detection have an integrated sensor, such as for example a piezo element, in order to be able to detect a striking of the table plate on rigid objects and subsequently to stop a movement of the table plate. Such devices for collision avoidance are necessary in order to be able to prevent damage to the table and to other objects, and in order to be able to avoid injuries to the operator and uninvolved persons.

From EP 1 460 914 B1 a device with adjustable elements is known, wherein a piezo element is provided in the device, which element, in the case of a detected collision, triggers a corresponding control signal for stopping or reversing the movement.

As such piezo elements can not detect any absolute forces, but rather only changes in force, in EP 2 583 586 B1 an improvement to the prior art was achieved in that instead of the piezo element a force sensor is used, which can also detect absolute load values onto a table plate.

The above-mentioned devices have the disadvantage that an operation of the height adjustment of the table plate must take place laboriously through the operation by means of a switch which is arranged anywhere on the table. Furthermore, the provision of a separate operating element is expensive, and a table construction becomes complex through the provision of cabling and of fastening possibilities for cables and operating elements.

Furthermore, an operator of the table, as mentioned above, must avert his eyes from his current activity and direct his gaze to the operating element, in order to subsequently be able to actuate the desired switch with his hand.

SUMMARY OF THE INVENTION

It is therefore an object of the invention to make available a height adjustment device by means of which the disadvantages of the prior art can be overcome.

With the present invention, it is advantageously possible to realize a full integration of all actuation elements within the drive column. This means that the entire control, for example in a height-adjustable table, can be integrated into the column. Nothing has to be added separately onto the table plate and no connection has to be provided between table plate and frame, etc. Thereby, moreover, an already existing height-adjustable table can be retrofitted without great effort. In addition, it is possible in an advantageous manner to use an already present jam protection sensor in a double manner.

When a measuring resistance, which has a constant electrical resistance, is connected in series with a force-sensitive sensor, the electrical resistance of which varies as a function of a force measured by it, it is advantageous if the resistance of the measuring resistance is selected such that the latter lies approximately in the same order of magnitude as the resistance of the force-sensitive sensor. Thereby, it is possible to derive from the voltage drop over the measuring resistance a load which is measured by the force-sensitive sensor. In the series connection of the measuring resistance with the force-sensitive sensor, it is, in addition, advantageous to connect the measuring resistance to earth, wherein the force-sensitive sensor is connected to a current source, through which the series connection is supplied with a supply voltage. Through the arrangement that the measuring resistance is connected to earth, the voltage drop can be measured over the measuring resistance simply and with little effort between earth and the node point which lies between the measuring resistance and the force-sensitive sensor. For measuring this voltage drop or respectively this voltage, it is advantageous to filter the measurement result through a filter or also to smooth it out. Thereby, mismeasurements are prevented. In order to be able to evaluate such a measurement signal, i.e. the voltage drop over the measuring resistance, it is advantageous if the measurement result is converted by an analog-digital converter into a digital signal, in order to enable the evaluation by a digital computing device. Through such a digital computing device, calculation results or respectively control commands resulting from the calculation can be emitted digitally directly, in order to be passed on for example to an electric motor.

It is advantageous that as force-sensitive sensor a sensor is used which has at least one conductor layer and a matrix of conductive and non-conductive material. The advantage of such an embodiment consists in that the conductivity of such a sensor is determined through how large the contact surface of the conductive materials is formed at the current point in time. Through a greater application of force onto the sensor, the contact surface between the conductive materials increases, and the conductance value of the sensor consequently increases, which results in a decreasing electrical resistance of the force-sensitive sensor. Vice versa, it applies that the contact surface between the conductive materials of the force-sensitive sensor becomes smaller when the application of force onto the sensor decreases. Thereby, the conductance value of the force-sensitive sensor decreases and its electrical resistance is increased.

Furthermore, it is advantageous to arrange such a force-sensitive sensor in a device for height adjustment of a table precisely so that a force which acts on a table plate is directly received and therefore detected as a pressure force by the force-sensitive sensor. In such an advantageous arrangement, the sensor is interposed in the force chain between table plate and table column.

With regard to the method for controlling the height-adjustable table, the following advantages result therefrom: In the prior art, force-sensitive sensors which are arranged in the force chain between table plate and table column are used exclusively for the detection of collisions. In the present invention, the advantages arise that a force-sensitive sensor which is provided for collision detection is additionally used as input element for the input of control commands for the height adjustment device of the table. In particular the advantage results therefrom that for the height adjustment of the table plate no operating element, which can be arranged on the table plate or on the table column, has to be operated by a user. Rather, provision is made that a user, by exertion of pressure onto for example a table plate, can cause the table to move or respectively vary the height of its table plate. When control commands are inputted in this manner, a variety of ergonomic advantages arise thereby for the user of such a table. For example, a height adjustment of the table downwards can be triggered in that a user presses the table plate downwards. Analogous thereto, a height adjustment upwards can be carried out in that a user pulls the table plate slightly upwards. Thereby in particular the advantage arises that such an operation can be carried out very intuitively. A user no longer has to actively give thought to the controlling of the table, rather, an adjustment can take place intuitively. Furthermore, the operator of such a table does not have to avert his eyes and hands from the work surface, but rather can carry out control commands simply, quickly and comfortably by a pressing down or respectively pulling up of the table plate.

For reasons of energy saving, the control of the table is basically situated at a rest mode in which no control commands are triggered by load changes on the table plate. In order to terminate the state of rest and to actively operate the height adjustment of the table, it is advantageous to exert a predefined force impulse onto the table plate, which was deposited as a corresponding wake-up impulse in the control. In the present embodiment, the user of the table presses the table plate downward for this for example with a force of 10 N twice briefly in succession, and then relieves the table again. The control detects the load deflection by means of monitoring the resistance of the force-sensitive sensor and detects that the user wishes to carry out a control command, because this force impulse was identified as a wake-up impulse. Moreover, it is to be noted that the wake-up impulse can be selected arbitrarily, but preferably so that it does not correspond to any naturally or usually occurring force impulse, in order to prevent inadvertent activations. The state of rest is now left and the control waits for control commands for raising or respectively lowering the table plate. If no control command is exerted by the user onto the table plate in this state, the control switches back into the state of rest again after a certain time. If, however, the user wishes to adjust the table plate, he can lower it by a pressure onto the table plate, i.e. a pressing downwards, or raise the table plate by a slight pulling up, i.e. an application of force onto the table plate from below upwards. Here, the sensation occurs for the operator as if he would raise or respectively press down the table plate by his own force. However, the expenditure of force necessary for this is very small, so that the table can be adjusted ergonomically and without great expenditure of force.

Now it is furthermore advantageous for the control to differentiate a control command of a user from the application of force onto a table plate which is brought about by a collision. This takes place in that the control evaluates the chronological course of the application of force onto the table plate. When this chronological course of the application of force is approximately constant, which is to be assumed during the pressing down of the table plate by a user, the control detects the process as a desired control command and controls the adjustment of the table plate downwards until the user either terminates the application of force or the adjustment device is situated at an end stop.

If, however, the chronological course of the signal changes intensively, the control detects that this application of force does not result from a control input of the user, but rather that this must concern a collision or respectively a jamming event. The motor is then stopped, the adjustment of the table plate is therefore halted. When the adjusting of the table plate was stopped, either owing to a collision or because the user has terminated his control input, the height adjustment device of the table is indeed at a standstill, but it is still active and waits for the next control command. The user of the table now has the possibility of triggering a movement of the table plate again by a simple pulling up or respectively pressing down of the table plate. If the user does not do this, the control returns to the state of rest again after a predetermined time. From this state of rest, the control device can now be awoken again, as mentioned above, by for example simple tapping or respectively brief pressing down or pulling up of the table plate. During the state of rest, the application of force onto the sensor is only interrogated in specified time intervals, in order to reduce the current consumption of the device or respectively of the control in the state of rest.

A particular embodiment of the invention relates to a sensor control for the activation of a height-adjustable table having at least two lifting columns and a table plate. For jam protection, in each lifting column a force-sensitive sensor, associated therewith, is installed. The signals of these sensors must now be evaluated so that the control unit can determine a wake-up function by detecting as a wake-up signal an abnormal or respectively individualized predetermined load sequence of the force-sensitive sensors stored in the control unit, when they act on the force-sensitive sensors. The particular difficulty in the case of more than one column now consists in that the signals of the sensors on application of the predefined force impulses for detecting the wake-up function according to the position of the sensor and the force application site on the table plate occur differently or respectively even conversely.

For example, when one raises the table on one side for activation of the control, there is a relief for the sensor. At the other column, however, one sees a load of the sensor, because in fact through the "oblique position" of the table or respectively through the new application point of the hand, the weight is also distributed differently onto the second column. In order to solve this problem, the control must always consider the two columns together. Here, the stronger sensor deflection decides which column must trigger a (or respectively the correct) command. Therefore, as soon as one has detected the command of a guide column as wake-up signal, starting from this point in time one must only still look at the signals of this sensor (master). The second (and actually always contrary) signal must be faded out. For this, it is necessary that the digitized signals are compared and evaluated together in the central control unit.

When, however, the force application onto the table plate takes place precisely in the center between the columns, the sensor signals are again identical. The control must then make a different decision and take the loading and relieving of both columns as control command or respectively the sensor signal of an arbitrary column as master sensor signal. This takes place until one establishes a defined difference between the two sensor signals; if this occurs, both commands are to be rejected and the usual method takes effect again as described in the preceding paragraph.

More precisely, the control unit has a comparison unit, which compares the loads of the two sensors with one another, wherein the control unit has a determination unit, which determines as master sensor the sensor which experiences the greater application of force, wherein starting from this determination only the master sensor is taken into consideration in the control unit, wherein the control unit moves the table plate upwards or downwards, as long as the master sensor determines a continuous loading upwards or respectively downwards, wherein the control unit stops the moving of the table plate as soon as the continuous loading stops.

With equally great load of the two sensors, the control unit determines arbitrarily that one of the two sensors is defined as master sensor and the signals of the other sensor are ignored for further controlling.

An advantageous further development consists in that a signal device is provided, which is activated when the wake-up function has been determined. This signal device can be, for example, an illuminating LED, which begins to illuminate when the wake-up function is determined. It can also be switched from a continuous illumination into a blinking mode, in order to confirm the wake-up function. Alternatively, other signal devices are also possible, such as for example an acoustic signal device.

According to a further embodiment of the invention, it is advantageous to use two force-sensitive sensors per table column. One sensor serves for detecting a collision, the second sensor serves for recognizing the wake-up signal or respectively the control of the height adjustment. The reason for the use of two sensors per column is that the sensitivity of the sensors can then be coordinated optimally to the problem which they have to solve, because a different sensitivity is required for the collision detection than for the recognition of the wake-up signal.

Furthermore, it is advantageous to use an FSR sensor, a "force sensing resistor", as force-sensitive sensor.

The arrangement of the sensor(s) directly in the column unit is advantageous, because on the one hand the flux of force can be measured optimally here, and because on the other hand no additional integration or respectively attachment provisions have to be made, which saves time and costs.

It is advantageous if the individual electronic structural elements are connected with one another via a bus system.

It is, furthermore, advantageous when the control is configured so that the extent of the force applied onto the sensor is responsible for the speed at which the height adjustment device is moved. This means that the greater the force which is applied onto the height-adjustable furniture part, the quicker the height adjustment device is operated, and vice versa.

BRIEF DESCRIPTION OF THE INVENTION

FIG. 2 is a schematic flow diagram of a method for controlling the height adjustment device according to an example embodiment according to the invention.

DETAILED DESCRIPTION OF THE INVENTION

Figure 1:
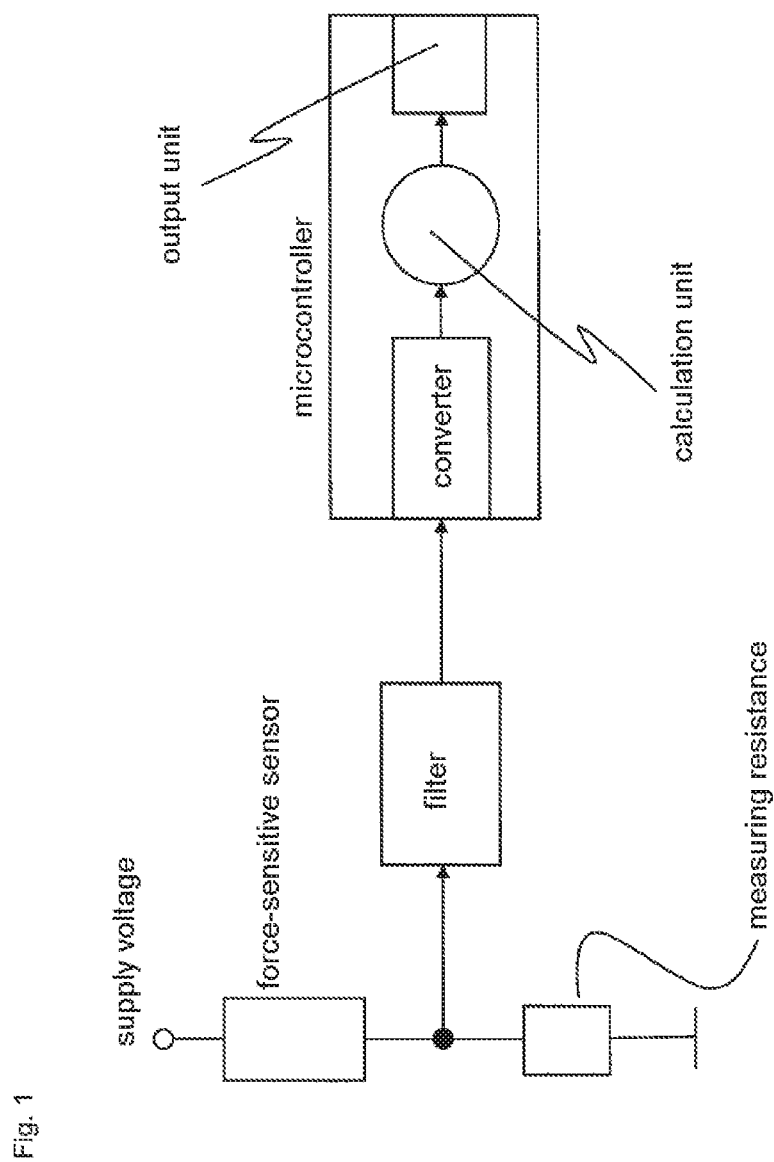
FIG. 1 is a schematic view of the circuit for a control of a height-adjustable table according to an example embodiment according to the invention. In it, the individual elements, which are required for realization of the circuit according to the invention, are explained.

FIG. 1 shows the schematic circuit arrangement of a circuit for controlling a height-adjustable table, wherein it can be seen in the illustration that the force-sensitive sensor and the measuring resistance are connected in series. The electrical resistance of the measuring resistance is fixed, therefore it does not vary. The electrical resistance of the force-sensitive sensor becomes less in the case of an application of force onto the sensor or respectively increases in a case in which the application of force onto the sensor decreases. A supply voltage is applied over the series connection, consisting of the force-sensitive sensor and the measuring resistance, wherein the lower end of the measuring resistance is connected to earth. Between measuring resistance and force-sensitive sensor a node point is formed, as can be seen in FIG. 1. At this node, a filter can be connected. The filter is provided to filter the chronological course of the voltage drop over the measuring resistance, i.e. to remove interferences and irrelevant deflections therefrom. At the output of the filter, which can be seen on the right-hand side of the filter in FIG. 1, a microcontroller is connected. Between earth and filter output, the interference-suppressed voltage can now be measured, which drops over the measuring resistance. As the circuit of measuring resistance and force-sensitive sensor is a series connection, and the supply voltage is applied over the entire series connection, the overall resistance of the series connection is composed of the added resistances of the force-sensitive sensor and of the measuring resistance. This means that the voltage likewise varies over the measuring resistance which can be measured at the filter output, with a variation of the electrical resistance of the force-sensitive sensor. This means that via a measurement of the voltage drop over the measuring resistance indirectly also the application of force of a physical force onto the force-sensitive sensor can be measured. The interference-suppressed voltage of the measuring resistance is now emitted at the filter and serves as input voltage for the microcontroller. The latter has as first component an analog-digital converter, which converts the analog input voltage of the measuring resistance into a digital signal. This digital signal can now be processed by a processing unit. This processing unit can generate output signals which can be emitted via an output unit to, for example, an electric motor for the height adjustment of a table. As can be seen in FIG. 1, in this embodiment the components analog-digital converter, processing unit and output unit are integrated into the microcontroller. However, this is not imperatively necessary.

FIG. 2 shows a schematic flow diagram for signal processing for the control of the height-adjustable table according to the invention, with a column or respectively with a sensor. The absolute force measured by the force-sensitive sensor is designated as F. In the state of rest of the table, $F=F_0$, wherein $F_0$ represents the basic load which is measured by the force-sensitive sensor in the state of rest of the table, without the latter being controlled for raising or respectively lowering. The described sequence begins in the "Start" field, the first step consists in the interrogation of the sensor. In this sensor interrogation, the currently measured force F, which is measured by the force-sensitive sensor, is interrogated. In the same step, a decision is made as to whether a force difference $\Delta F$ is present, wherein $\Delta F=F=F_0$ applies, and this force difference $\Delta F$ is greater than a force difference $\Delta F_{wake-up}$, wherein the force difference $\Delta F_{wake-up}$ represents a force difference which is necessary for the waking up of the table control. This therefore concerns a force impulse which must be applied by a user onto the table plate in order to inform the control that a movement is desired. The user thereby wakes the control up from its state of rest and sets it into an active state. In the step "Interrogation Sensor Rest", it is therefore determined whether $\Delta F>\Delta F_{wake-up}$. The above-mentioned embodiments with regard to the wake-up signal are only to be understood as being by way of example and for the sake of simplicity are only defined with a force impulse. In practice, it will be necessary to define a more individual signal or respectively a signal sequence as wake-up signal, so that malfunctions can not arise inadvertently. For example, a shaking or an upward pulling or pressing downward carried out briefly twice in succession could be defined as wake-up signal. This predefined wake-up signal must then be stored in the control. If the interrogation produces "no", the sequence continues to a second time emitter, which now delays the sequence until a previously determined time span $\Delta t_2$ has elapsed. The time span $\Delta t_2$ can lie for example at 100 ms. Thereafter, the sequence continues to the step "Interrogation Sensor Rest". If, in the step "Interrogation Sensor Rest", the condition $\Delta F>\Delta F_{wake-up}$ is present, the control continues to the step "Control wakes up". Here, it is, furthermore, expedient for the fulfilling of this condition, that the application of force must have disappeared again after a short time, in order to be able to differentiate a pressing down of the table plate from the placing of an object on the table plate. On fulfilling of the condition of the step "Interrogation Sensor Rest", the state of rest of the control is subsequently relinquished, it is now connected actively.

The sequence now continues to the step "Interrogation Sensor Active". In this step, a check is made as to whether the signal is $\Delta F>0$. If yes, the sequence continues to the step "Control decides whether start-up criterion is fulfilled". In this step, the control decides whether $\Delta F>\Delta F_{min}$, wherein $\Delta F_{min}$ represents precisely the application of force which must be expended by a user onto the table plate in order to trigger a movement of the table plate. If the condition $\Delta F>\Delta F_{min}$ is not fulfilled, the sequence continues to the step "Time emitter 1". As long as a predetermined time span $\Delta t_1$ has not elapsed, it is now determined permanently in the step "Interrogation Sensor Active" whether $\Delta F>0$. If $\Delta F>0$, the sequence continues to the step "Control decides whether start-up criterion is fulfilled" and the first time emitter loses its effect. If, however, the condition $\Delta F>0$ is not present for a period of time $\Delta t_1$, the sequence continues to the step "Control falls asleep". The period of time $\Delta t_1$ can lie in a range from a few seconds to several minutes.

When, in the step "Control decides whether start-up criterion is fulfilled", it is determined that $\Delta F>\Delta F_{min}$, this means that the control has recognized that a user wishes to move the height of a table plate. Now a check is made in step "Decision Jamming Event" as to whether the signal $\Delta F$ remains largely constant, or whether this changes intensively. If the signal $\Delta F$ remains constant, the motor is moved as long as the condition $\Delta F>\Delta F_{min}$ applies. Thereafter, the moving of the motor is terminated, and the sequence returns to the step "Interrogation Sensor Active". If in the step "Decision Jamming Event" it is determined that the signal $\Delta F$ changes intensively, a collision of the moved table plate with an object is determined, and the sequence continues to the step "Stop motor", in which the moving of the table plate is terminated. Thereafter, the sequence continues to step "Time Emitter 1". As long as a predetermined time span $\Delta t_1$ has not elapsed, it is now permanently determined in the step "Interrogation Sensor Active" whether $\Delta F>0$. If this condition is present, the first time emitter loses its effect again and the sequence continues to the step "Control decides whether start-up criterion is fulfilled". And if the condition $\Delta F>0$ is not present for a time period $\Delta t_1$, the sequence again continues to the step "Control falls asleep".

It is, in addition, expedient, that the application of force $\Delta F$ between the step "Control wakes up" and "Interrogation Sensor Active" or "Interrogation Sensor Rest" and "Control wakes up" must be zero for a time period of for example 1 to 2 seconds. Otherwise, for example, an adjustment of a table plate could be triggered by two weights placed in succession on a table plate.

The described circuit and the described method could also be modified to the effect that instead of the force-sensitive sensor a strain gauge (DMS sensor), a pressure sensor, or else a piezo element is used in order to detect an application of force onto a movable part of a table. In addition, also several identical or different sensors could be used.

Irrespective of the sensor used for this, this waking up could, in addition, take place not only by a pressing down or respectively pulling up of a movable part of a table, but also by a lateral wobbling or shaking on, for example, a table plate.

Generally, all statements which are directed to a height-adjustable table also apply to all other types of height-adjustable pieces of furniture.

In the case of a table according to a second embodiment with two columns, the control takes place as follows.

A sensor is associated with each column. A sensor control is provided. The control unit has a storage unit in which, inter alia, a predetermined wake-up signal is stored, which is compared with the signals of the sensors in order to be able to determine a wake-up function. In the present example, the wake-up signal exists, which is emitted from a pulling up twice of the table plate within a time span of two seconds by the sensors.

In order to detect which sensor signal is to be taken into consideration, and which is to be ignored, a comparison unit is provided, which compares the loads of the two sensors with one another. A determination unit then determines as master sensor the sensor which experiences the greater application of force.

When the wake-up function has been determined, the subsequent signal of the sensor is used as command, so that the control unit moves the table plate upwards or downwards, as long as the master sensor determines a continuous load upwards or respectively downwards.

According to a particular embodiment, it is possible to take into consideration the extent of the force which is exerted onto the force sensor by pressing onto, or respectively pulling of, the table plate or respectively of the height-adjustable furniture part, so that through stronger pressing or respectively pulling the adjustment speed increases accordingly. With little force, the adjustment speed will decrease accordingly. Thereby, the operability and the ease of use increases considerably.

The control unit is adapted to cease with the moving of the table plate as soon as the continuous load ceases. This takes place either by letting go of the table plate or by colliding against an obstacle or an end switch, because thereby the signal indeed does not cease, but rather either becomes oppositely directed, because the run-up against an obstacle or against an end switch generates a contrary counterforce, or increases up to over a threshold value which is to be established in advance, from which it follows that the risk of damage or of injury to the operating personnel is present.

When the lifting column must be calibrated in its position, i.e. when the lifting column must ascertain its current position, it is usual to carry out a reset function for the calibration of the position of the lifting column. For this, a switch is used, which is actuated for switching the carrying out of the reset function.

It is advantageous, instead of the switch for switching the carrying out of the reset function, to deposit in the control a previously established sensor signal course for carrying out a reset, which differs from the wake-up signal. By recognizing the sensor signal course for carrying out a reset in the case of corresponding pulling up or respectively pressing down or shaking of the lifting column, as is delivered from the sensor to the control, the control determines that the reset function is to be carried out.

In addition, it is advantageous that the table plate can be operated from all sides. This represents in particular a great advantage compared with conventional solutions, in which a membrane switch or an induction loop has to be provided on the table plate at the locations at which the operation is to take place.

In addition, it is advantageous, alongside the sensor(s) for the input of control commands to provide at least one additional sensor, which serves as sensor for a jam protection mechanism. The sensor for the input of control commands and the sensor of the jam protection mechanism can be arranged one over another here. This arrangement can, in addition, be arranged or respectively accommodated inside the height adjustment device.

With the use of additional sensors for the detection of collisions (jamming), it is, in addition, advantageous that the sensors have different sensitivities for signal detection. The sensitivity of the sensor for the detection of control commands can be higher here (therefore more sensitive) than the sensitivity of the sensor for the detection of collisions. This is because with the executing of control signals onto a table plate, smaller forces will occur than in the case of a collision or respectively of a jam. The sensitivities of the sensors are optimized here for their field of application.

In addition, the control is advantageously adapted to carry out a learning mode or respectively to change into the latter. In this learning mode, all commands, by which for example a height-adjustable table can be operated by a user, can be individually determined and programmed in. On an activation of the learning mode, a user can, for example, input the command, by which the control is woken up and changes into an operating mode. For this, the control detects the command "played" by the user, or respectively the course of the sensor values resulting therefrom. The control processes and modifies the signal (the course) thereupon, in order to subsequently store the command of the user. Such a "teaching" of new commands is conceivable for each function of the height-adjustable table.

Finally, it is also to be noted that all the embodiments which refer to a height-adjustable table are likewise transferrable to all height-adjustable items of furniture and likewise to beds, in particular hospital beds. The previously described embodiments are therefore also to be transferrable and likewise apply to these additional possibilities of application.

What is claimed is:

1. A height-adjusting mechanism for adjusting a height of a height-adjustable portion of a furniture item, the furniture item comprising a first lifting column and a second lifting column, the height-adjusting mechanism comprising:
   in the first lifting column, a first sensor force-sensitive for detecting a first-column pulling force, a first-column pressing force, and a first-column shaking force on the first column from an external force on the height-adjustable portion, the first sensor issuing a first plurality of signals responsive to the first-column pulling force, the first-column pressing force, and the first-column shaking force;
   in the second lifting column, a second sensor force-sensitive for detecting the second-column pulling force, the second-column pressing force, and the second-column shaking force on the second column from the external force from the height-adjustable portion, the second sensor issuing a second plurality of signals responsive to the second-column pulling force, the second-column pressing force, and the second-column shaking force;
   a controller for receiving the first plurality of signals and the second plurality of signals, the controller comprising a sleep mode, a wake-up mode, a trigger mode, an operating mode, and a stop mode; the controller storing a wake-up signal pattern and a trigger signal pattern,
   the wake-up mode for determining whether at least a first signal of either the first plurality of signals or the second plurality of signals corresponds to the wake-up signal pattern, responsive to the at least first signal matching the wake-up signal pattern, the wake-up mode monitoring for at least a second signal of either the first plurality of signals and the second plurality of signals corresponding to the trigger signal pattern,
   responsive to the at least second signal matching the trigger signal pattern, the trigger mode triggering an upward movement or a downward movement of the height-adjustable portion, and
   responsive to at least a third signal either of the first plurality of signals and the second plurality of signals, the operating mode performing the upward movement or the downward movement of the height-adjustable portion, the at least third signal being indicative of the pulling force or the pressing force;

the stop mode stopping the upward movement or the downward movement of the height-adjustable portion;

wherein the controller has a comparison unit, which is adapted to compare the loads of the two sensors with one another, wherein the controller comprising a determination unit, the determination unit comprising a master sensor for determining whether the first sensor or the second sensor experiences a greater application of the external force on the height adjustable portion.

2. The height-adjusting mechanism as claimed in claim 1, wherein the first sensor is an force sensing resistor sensor.

3. The height-adjusting mechanism as claimed in claim 1, wherein the first sensor is a strain gauge sensor.

4. The height-adjusting mechanism as claimed in claim 1, wherein the first sensor is a piezo sensor.

5. The height-adjusting mechanism as claimed in claim 1, further comprising a jam protection mechanism, the jam protection mechanism being responsive to the first sensor.

6. The height-adjusting mechanism as claimed in claim 1, wherein the second sensor detects a collision or a jam for a jam protection mechanism.

7. The height-adjusting mechanism as claimed in claim 6, wherein first sensor and the second sensor are disposed sensors are arranged in series vertically with respect to a floor surface.

8. The height-adjusting mechanism as claimed in claim 6, wherein the first sensor comprises a first sensitivity and the second sensor comprising a second sensitivity,
wherein the first sensitivity differs from the second sensitivity;
wherein each of the sensitivities is optimized for a respective task.

9. The height-adjusting mechanism of claim 1, wherein the controller, when the application force is equally great on the first sensor and the second sensor, the controller arbitrarily selects one sensor as the master sensor and signals of the non-selected sensor are ignored.

10. The height-adjusting mechanism of claim 1, further comprising a signal device activated when the wake-up mode has been determined.

11. The height-adjusting mechanism of claim 10, wherein the signal device emits an acoustic signal or a visual signal.

12. The height-adjusting mechanism of claim 1,
wherein the controller comprises a reset function to calibrate a position of the height-adjustable portion of the furniture item, and
further comprising a switch for performing the reset function.

13. The height-adjusting mechanism of claim 1, wherein the controller comprises a pre-determined sequence of signals from the plurality of signals, the pre-determined sequence triggering the controller to perform a reset function to calibrate a position of the height-adjustable portion of the furniture item;
the pre-determined sequence being different from the wake-up signal pattern.

14. The height-adjusting mechanism of claim 1, wherein the controller controls a speed of the upward movement or the downward movement of the height-adjustable portion responsive the pulling force, the pressing force, or the shaking force acting on the sensor;
wherein the speed of the respective upward movement or the respective downward movement of the height-adjustable portion is directly proportionally responsive to the pulling force, the pressing force, or the shaking force.

15. The height-adjusting mechanism of claim 1, further comprising a bus system for interconnecting the first sensor and the controller.

16. The height-adjusting mechanism of claim 1, wherein the controller and the first sensor are disposed on a frame, but not on the height-adjustable portion of the furniture item.

17. The height adjusting mechanism of claim 1, wherein the first sensor is force-sensitive for detecting the pulling force, the pressing force, and the shaking force affecting any side of the height-adjustable portion.

18. A method of adjusting a height of a height-adjustable portion of a furniture item,
the furniture item comprising a first lifting column and a second lifting column, the height-adjusting mechanism comprising
in the first lifting column, a first sensor force-sensitive for detecting a first-column
pulling force, a first-column pressing force, and a first-column shaking force on the first column from an external force on the height-adjustable portion, the first sensor issuing a first plurality of signals responsive to the first-column pulling force, the first-column pressing force, and the first-column shaking force;
in the second lifting column, a second sensor force-sensitive for detecting the second-column pulling force, the second-column pressing force, and the second-column shaking force on the second column from the external force from the height-adjustable portion, the second sensor issuing a second plurality of signals responsive to the second-column pulling force, the second-column pressing force, and the second-column shaking force;
a controller for receiving the first plurality of signals and the second plurality of signals, the controller comprising a sleep mode, a wake-up mode, a trigger mode, an operating mode, and
wherein the controller has a comparison unit, which is adapted to compare the loads of the two sensors with one another,
wherein the controller comprising a determination unit, the determination unit comprising a master sensor for determining whether the first sensor or the second sensor experiences a greater application of the external force on the height adjustable portion;
the method comprising the steps of:
in the wake-up mode, determining, by the controller, whether a wake-up impulse comprising at least a first signal of the plurality of signals corresponds to a wake-up signal pattern,
responsive to the at least first signal matching the wake-up signal pattern, monitoring, by the controller, for a movement impulse comprising at least a second signal of the plurality of signals corresponding to a trigger signal pattern,
in the trigger mode, responsive to the at least second signal matching the trigger signal pattern, triggering by the controller an upward movement or a downward movement of the height-adjustable portion, and
in the operating mode, responsive to at least a third signal of the plurality of signals, performing the upward movement or the downward movement of the height-adjustable portion, the at least third signal being indicative of the pulling force or the pressing force;

in the stop mode, stopping by the controller the upward movement or the downward movement of the height-adjustable portion.

19. The method as claimed in claim 18, wherein the wake-up impulse is selected so that it differs from an impulse for controlling a normal operating behavior such as an up and down moving of the height-adjustable furniture part, in order to prevent inadvertent moving.

20. The method as claimed in claim 18, wherein the first sensor senses a collision.

21. The method as claimed claim 18, further comprising the step of
calibrating a position of the height-adjustable portion using a switch to perform a reset function.

22. The method as claimed in claim 18,
wherein the controller comprises a pre-determined sequence of signals from the plurality of signals, the pre-determined sequence being different from the wake-up signal pattern;

wherein the method further comprises
performing, by the controller, in response to the pre-determined sequence a reset function to calibrate a position of the height-adjustable portion of the furniture item.

23. The method as claimed claim 22, further comprising the step of
learning, while recording and storing the wake-up impulse or performing the reset function, a plurality of new signals;
comparing at least one new signal to the wake-up signal pattern or the trigger signal pattern.

24. The method as claimed in claim 18, wherein the height of the height-adjustable portion can be adjusted from all sides of the furniture item.

\* \* \* \* \*